United States Patent [19]

Seiger

[11] Patent Number: 4,851,310
[45] Date of Patent: Jul. 25, 1989

[54] MICROPOROUS ELEMENTAL SILVER ARTICLE AND METHOD

[75] Inventor: Harvey N. Seiger, Mayfield Heights, Ohio

[73] Assignee: Gould Inc., Rolling Meadows, Del.

[21] Appl. No.: 98,381

[22] Filed: Sep. 18, 1987

[51] Int. Cl.⁴ .......................... H01M 4/04; H01M 4/54
[52] U.S. Cl. ...................................... 429/219; 204/2.1; 428/613
[58] Field of Search .......................... 204/2.1; 429/219; 29/623.5; 428/613, 673, 645, 647, 634

[56] References Cited

U.S. PATENT DOCUMENTS

| | | | |
|---|---|---|---|
| 3,671,321 | 6/1972 | Herman et al. | 136/75 |
| 4,003,757 | 1/1977 | Lux et al. | 429/219 |
| 4,009,056 | 2/1977 | Megahed et al. | 429/126 |
| 4,038,467 | 7/1977 | Lippold et al. | 429/219 |
| 4,120,757 | 10/1978 | Seiger et al. | 204/2.1 |
| 4,269,907 | 5/1981 | Momyer et al. | 429/67 |
| 4,481,266 | 11/1984 | Littauer et al. | 429/12 |
| 4,681,663 | 7/1987 | Seiger | 204/21 |

OTHER PUBLICATIONS

Seiger, et al., "Nickel Oxide Electrode Development," in *Proceedings-27th Power Sources Symposium*, Jun. 21-24, 1976, at 115-120.

Primary Examiner—John F. Niebling
Assistant Examiner—William T. Leader
Attorney, Agent, or Firm—Marshall, O'Toole, Gerstein, Murray & Bicknell

[57] ABSTRACT

A method of forming an article comprising microporous elemental silver is disclosed wherein a porous conductive substrate is impregnated with molten silver nitrate. The silver nitrate in the pores of the substrate is then crystallized. Subsequently, the silver nitrate crystals are converted to $Ag_2O$ and electrochemically reduced to yield microporous elemental silver. In addition, the invention comprehends articles formed by this method, as well as the preparation of articles therefrom.

33 Claims, 5 Drawing Sheets

MICROPOROUS ELEMENTAL SILVER ARTICLE AND METHOD

BACKGROUND OF THE INVENTION

1. Field of the Invention

This invention relates generally to novel forms of elemental silver and, more particularly, this invention relates to articles including microporous elemental silver, methods of preparing the same and methods of preparing articles made therefrom.

2. Description of Related Art

Electrochemical cells utilizing bipolar electrode designs having reactive metal electrodes supported on a substrate current collector are well-known. See, for example, Momyer et al, U.S. Pat. No. 4,269,907 (May 26, 1981), the disclosure of which is hereby incorporated by reference, wherein cells including an aqueous electrolyte, an anode of an alkali metal, such as lithium, for example, a cathode spaced from the anode, and an intercell electrical connector are disclosed. The intercell electrical connector typically comprises a substrate of a conductive metal (which may be in the form of foil or a plate) such as nickel or silver-plated nickel. The anode is formed on one surface of the substrate with the cathode of an adjacent cell on the opposite surface of the substrate. In such cells, the cathode may comprise an electrochemically active material, such as silver oxide, and the electrolyte may comprise an aqueous alkaline solution.

Momyer et al also disclose an electrochemical cell stack comprising a plurality of bipolar electrodes connected in series.

Silver oxide electrodes are generally useful in silver oxide/lithium electrochemical cells as well as in other electrochemical power generating systems, such as silver oxide/aluminum, silver oxide/zinc, silver oxide/iron and silver oxide/cadmium cells. In the past, the silver oxide electrodes used by the silver battery industry have generally been fabricated either from chemically produced silver oxide powder or from metallurgically produced silver powder which in turn is oxidized to form silver oxide.

For example, in forming a silver oxide/lithium bipolar electrode according to the conventional process commonly known as parallel oxidation, silver powder is first extruded onto a transfer paper from a rolling mill. This "biscuit" of silver is then sintered and hot forged onto a conductive metal foil substrate. The metal foil is generally made thin both for design considerations, e.g., weight and volume minimization, and economic considerations, i.e., cost minimization. For example, silver clad nickel foil substrates having a thickness of only about 1 mil are commonly used in the formation of silver oxide/lithium bipolar electrodes. The hot forgings of silver on metal substrates are then assembled in a stack in which the forgings of silver and nickel counter electrodes are alternated and separated by a non-conductive separator material to reduce the likelihood of short circuits developing between the substrates and the forgings of silver during the charging process.

All of the silver forgings in the charging stack are electrically connected in parallel for attachment to the positive terminal of a DC power supply. All of the nickel counter electrodes are in turn electrically connected in parallel for attachment to the negative terminal of the aforementioned DC power supply. The charging stack is then placed in an aqueous electrolyte, such as a metal hydroxide solution. Ionic current flow is generated through the aqueous electrolyte and the silver is thereby oxidized. The electrochemical process occurring at the nickel counter electrodes is cathodization which results in the release of hydrogen gas, as follows:

$$4H_2O + 4e^- \rightarrow 2H_2 + 4OH^- \quad (1)$$

The silver is electrochemically oxidized first to the monovalent state (see equation 2, below) and may then be oxidized to the divalent level or the peroxide state (see equation 3, below):

$$2Ag + 2OH^- \rightarrow Ag_2O + H_2O + 2e^- \quad (2)$$

$$Ag_2O + 2OH^- \rightarrow 2AgO + H_2O + 2e^- \quad (3)$$

The theoretical electromotive force (EMF) for the oxidation of Ag to the monovalent level is +0.342 volt. The standard redox potential of oxygen is +0.401 volt and, consequently, oxygen gas does not evolve at the voltage level associated with the oxidation of Ag to the monovalent state. The second stage of oxidation of the active silver material, however, occurs at an electric potential of about +0.599 volt which is nearly 0.2 volt greater than the oxygen evolution voltage. Consequently, the oxidation process at this upper voltage level is inefficient as oxygen gas is evolved thereby.

Batteries having both high capacities and high discharge rates are required in many applications. Further, because of design considerations, many applications require batteries having essentially flat electrodes. Flatness is a particularly important consideration in bipolar electrode configurations wherein both the anode and cathode active materials are bonded on opposite sides of a conductive metal substrate.

The above-described method of electrode formation, however, frequently results in bent electrodes. For example, silver oxide electrodes prepared by the parallel oxidation method of formation are frequently of a bent, irregular shape. The bending of the electrodes is believed to be largely a result of the stoichiometric and molar volume changes which occur upon oxidation during electrode formation and is commonly referred to as "potato chipping".

SUMMARY OF THE INVENTION

It is an object of the invention to overcome one or more of the problems described above.

According to the invention, a method of forming an article comprising microporous elemental silver includes the steps of impregnating a porous conductive substrate with a liquid comprising molten silver nitrate, crystallizing the silver nitrate in the pores of the substrate, converting the crystallized silver nitrate in an alkaline medium to form $Ag_2O$ and electrochemically reducing the $Ag_2O$ to yield microporous elemental silver.

In addition, the invention comprehends articles formed by this process, as well as the preparation of articles therefrom.

Other objects and advantages will be apparent to those skilled in the art from the following detailed description taken in conjunction with the figures and the appended claims.

DETAILED DESCRIPTION OF THE INVENTION

Figure 1:
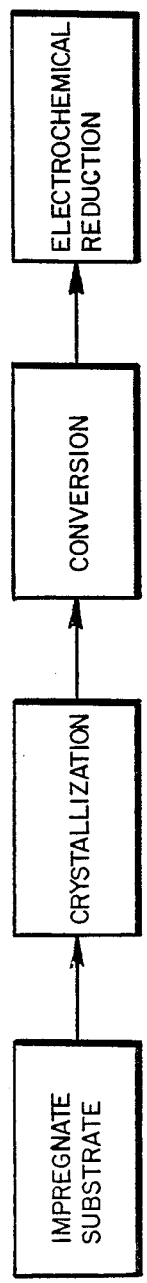
FIG. 1 is a simplified flow diagram for the formation of an article comprising microporous elemental silver according to an embodiment of the invention.

According to the invention, the preparation of elemental silver via electrochemical reduction serves to introduce microporosity into the silver crystals. This microporosity assists in stabilizing the dimensions of the silver active material so that an article made therefrom will have geometric measurements such as length, width, and thickness which remain virtually constant regardless of the oxidation state of the active material.

According to the invention, a porous conductive substrate such as reticulated vitreous carbon (RVC) manufactured by Fluorocarbon Co. of Anaheim, Calif., is immersed in molten silver nitrate salt and thereby impregnated therewith. It is also to be understood, however, that other porous conductive substrate materials such as foamed silver, lead or tin may be used in the practice of the invention.

Alternatively, a porous conductive substrate formed by heating a homogeneous mixture of silver oxalate and elemental silver in a reducing atmosphere to reduce at least a portion of the silver oxalate to elemental silver may, because of the presence of silver therein, be a preferred substrate material for use in some applications.

A porous conductive substrate made from elemental silver powder and silver oxalate (to control the porosity) may be formed by either a dry or a slurry process. Using a dry process, a homogeneous mixture of elemental silver powder and silver oxalate is formed into a precursor body which is heated in a reducing atmosphere to reduce a portion of the silver oxalate to elemental silver to form the porous substrate.

The preparation of a porous conductive substrate, such as by heating a mixture of silver oxalate and elemental silver in a reducing atmosphere, can be done by one skilled in the art, guided by the teachings contained herein. For example, a precursor body made of a homogeneous mixture of elemental silver powder and silver oxalate may be passed through and heated in reducing atmosphere, e.g. cracked ammonia, hydrogen, or water gas, contained in a belt furnace.

The reducing atmosphere is maintained in the central portion of the furnace such as by means of inert gas, e.g., nitrogen gas, curtains. The inert gas curtains act to prevent atmospheric oxygen from entering into the furnace and reacting therein.

It is to be understood that in this way, the mixture of silver oxalate and elemental silver is heated to a temperature of about 850° C., preferably up to about the sintering temperature of silver, e.g., about 500° C., with the silver oxalate being reduced whereby a porous conductive substrate, such as a material having a porosity of about 90% or more, is formed. Control of the size of the voids in the material is effected by the heat conditions and the ratio of the oxalate compound to silver in the mixture.

A body having a high porosity is obtained because silver oxalate ($Ag_2C_2O_4$) has a molar volume of about 60 cm$^3$ whereas elemental silver has a molar volume of only about 10 cm$^3$. Thus, reduction of $Ag_2C_2O_4$ results in a structure having a void volume of about 40cm$^3$ per mole, which void volume is in addition to the natural void volume inherent in any powder.

Such highly porous structures are generally very compliant. Thus, in order to produce a structure which will remain flat during stress producing and/or generating operations, such as experienced in the oxidation of precursor electrodes, for example, such porous structures must be reinforced.

It is known that silver nitrate melts at a relatively low temperature, i.e., 212° C., thus facilitating the preparation of a bath of the molten silver nitrate salt. Immersing the porous substrate in a bath of pure molten silver nitrate results in the porous substrate having a fill level in the order of about 60%, i.e., about 60% of the pores of the porous substrate are penetrated with molten silver nitrate.

Again referring to FIG. 1, silver nitrate within the pores of the substrate is then crystallized such as by allowing the impregnated porous body to cool to room temperature.

Subsequently, the crystallized silver nitrate is converted to form $Ag_2O$, such as by placing the porous conductive substrate with silver nitrate crystallized in pores thereof, in an alkaline medium. For example, the substrate with silver nitrate crystallized therein may be placed in a glass tank containing an alkaline medium such as an aqueous solution of potassium hydroxide or sodium hydroxide.

The silver nitrate is then electrochemically reduced in an alkaline medium to yield microporous elemental silver. The alkaline medium may, for example, comprise an aqueous solution of water soluble metal hydroxides such as potassium hydroxide or sodium hydroxide. For example, such electrochemical reduction may be conducted in the same tank in which the conversion of the crystallized silver nitrate to form $Ag_2O$ was done.

The fill level of the porous conductive structure may be calculated from the formula weights (F. W.) and densities (d, in grams per cm$^3$) of the materials involved. For example, anhydrous silver nitrate has a F.W.=169.87 and d=4.352 g/cm$^3$. Silver is produced with a F.W.=107.88 and d=10.5 g/cm$^3$. The volume occupied in the porous structure is about 0.53 cm$^3$, or a residual void volume of 47%.

It is to be understood that the above-described process involving the steps of impregnation, crystallization, conversion and electrochemical reduction may, if desired, be followed by one or more sequential carrying out of these steps followed by oxidation to form argentic oxide (AgO) with a volume utilization approaching a level of about 90% and yielding a loading level whereby the filled body has a density of about 5.04 g/cm$^3$. If desired, the argentic oxide may be further densified, up to at least about 6.6 g/cm$^3$, for example, by repetitive impregnation and crystallization.

The density of argentic oxide can be decreased or more finely controlled through the addition of water to the molten silver nitrate salt, as AgNO$_3$ is very soluble in water. Thus, whereas at atmospheric conditions pure molten silver nitrate salt has a molar concentration of about 25M, any concentration of the molten salt less than 25M can be achieved via the addition of water and appropriate pressurization of the vessel containing the solution.

Thus, a two cycle impregnation process can be employed to attain an argentic oxide density of any value between about 3.8 and 5.0 g/cm$^3$ by appropriate water dilution of the molten salt.

After washing and drying, the microporous elemental silver prepared by the above-described process may be used as an active material in precursor electrodes for the formation of silver oxide (AgO) electrodes. For example, the microporous elemental silver so formed may be used to fabricate a silver oxide/lithium bipolar electrode according to a process analogous to the abovedescribed process of parallel oxidation. In such a process, a precursor electrode comprising the prepared microporous elemental silver is oxidized to form silver oxide.

Figure 2:
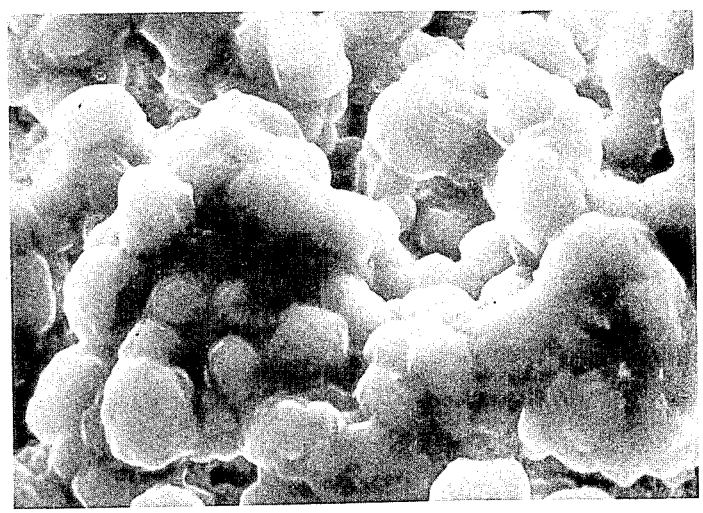
FIG. 2 is a photomicrograph (3000 magnification) of non-microporous elemental silver prepared electromechanically using a prior art method.
Figure 3:
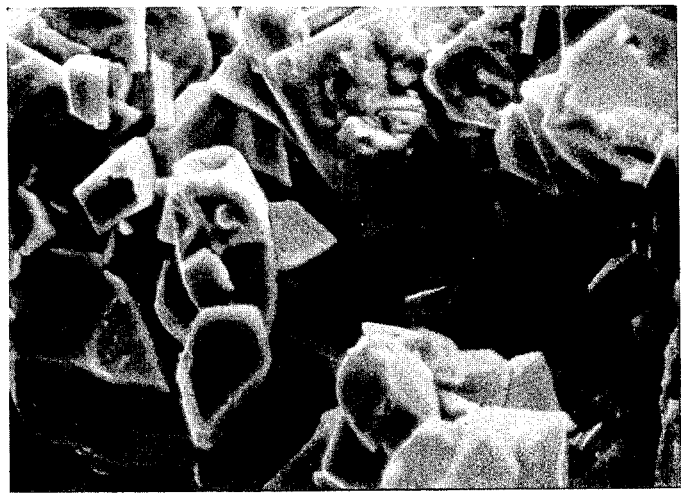
FIG. 3 is a photomicrograph (2900 magnification) of AgO crystals prepared by charging (anodizing) elemental silver.
Figure 4:
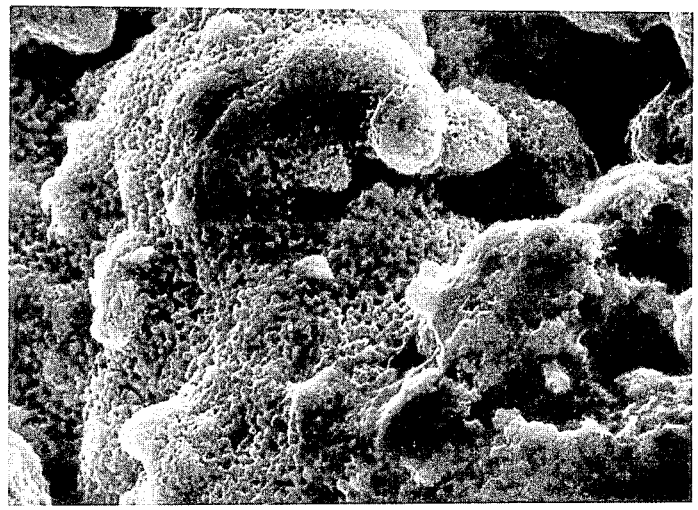
FIG. 4 is a photomicrograph (3000 magnification) of electrochemically prepared microporous elemental silver.

Silver material, in various forms, has been observed microscopically using a scanning electron microscope (SEM). FIG. 2 is a photomicrograph of electromechanically prepared non-microporous elemental silver prepared using a prior art method. FIG. 3 is a photomicrograph of AgO crystals prepared by charging (anodizing) elemental silver. FIG. 3 shows the enlargement of the silver grain to crystals generally having ten (10) sides. The subsequent electrochemical reduction of the oxide to elemental silver introduces a microporosity within the elemental silver crystals as shown in FIG. 4 which illustrates microporous elemental silver as prepared by a process of reducing an oxidized form of silver. (See the copending, commonly assigned application Ser. No. 98,382 filed Sept. 18, 1987 of Harvey N. Seiger, entitled "Microporous Elemental Silver and Method", the entire disclosure of which is incorporated herein.)

Subsequent oxidation of precursor electrodes prepared from such electrochemically prepared silver usually will not generate the types of stress conditions in the precursor electrode as are commonly associated with precursor electrodes prepared from non-microporous silver and which result in bent, irregularly shaped silver oxide electrodes.

Figure 5:
FIG. 5 is a simplified flow diagram of a process for the formation of a silver oxide/reactive metal bipolar electrode according to a typical embodiment of the invention.

Referring to FIG. 5, a simplified flow diagram of a process for the formation of a silver oxide/reactive metal bipolar electrode according to the invention is shown. An article comprising microporous elemental silver, such as that prepared using the process diagrammed in FIG. 1, is washed with water or other suitable liquid to remove remaining traces of the aqueous hydroxide electrolyte. (Such hydroxides can react with carbon dioxide, as are present in the air, to form basic carbonates which can clog pores of the microporous elemental silver.)

Thereafter, using a process analogous to the abovedescribed process of parallel oxidation, a bipolar electrode is made wherein an article comprising microporous elemental silver, such as that described above, is utilized as a precursor electrode material. In such a process, the filled substrate is placed on a transfer paper from a rolling mill. This "biscuit" containing microporous elemental silver is then sintered and hot forged onto a conductive metal foil substrate, such as a silver clad nickel foil as is known to those in the art. It is to be understood that the "biscuit", in addition to microporous elemental silver, contains the relatively inert material of which the porous conductive substrate was made, e.g. foamed silver, lead, or tin, etc., and in which the microporous elemental silver is, according to the invention, formed. Generally, the relatively inert material of the porous substrate remains intermixed with the microporous elemental silver throughout subsequent processing.

Subsequently, the hot forgings of microporous elemental silver on metal foil substrates are assembled in a stack in which the forgings of microporous silver and nickel counter electrodes are alternated. The silver forgings and the nickel counter electrodes are separated by a non-conductive separator material to reduce the likelihood of the development of short circuits during oxidation of the elemental silver.

The elemental silver forgings are then oxidized, such as through techniques known in the art, to form silver oxide with the precursor electrode of the sintered and hot forged microporous elemental silver being oxidized to sequentially form Ag$_2$O and AgO. Upon such oxidation, the microporous elemental silver forms AgO crystals, with enlargement of the silver grain to crystals occurring largely in the void volume as provided by the micropores of the silver material and only in relatively minor proportion in the macropores of the precursor material. Thus, electrochemically prepared silver will not experience significant changes in particle size upon subsequent oxidation to the oxide form and a precursor electrode prepared from electrochemically prepared elemental silver will have virtually constant dimensions, regardless of the oxidation state thereof.

Figure 6:
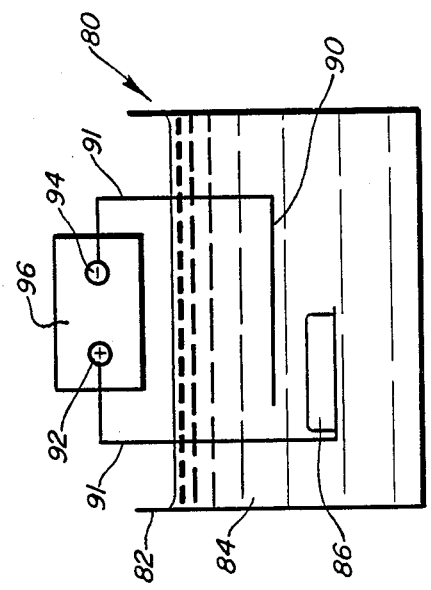
FIG. 6 is a simplified schematic representation of a system for the electrochemical anodization of a precursor electrode comprising microporous elemental silver according to a typical embodiment of the invention.

For example, referring to FIG. 6, a system, generally designated 80, for the anodization (i.e., oxidation) of such a precursor electrode is shown. The system 80 includes a container 82 holding a quantity of an aqueous alkaline electrolyte 84. A filled porous body precursor electrode 86 and a conductive sheet of metallic elemental silver 90 are disposed, either horizontally or vertically, in the aqueous alkaline electrolyte 84 and are electrically connected by wiring 91 to the positive and negative terminals 92 and 94, respectively, of a power supply 96. The aqueous alkaline medium 84 covers the porous body 86 and electric current produced by the power supply 96 is passed through the wiring 91 and subsequently through the porous body 86, the silver sheet 90 and the electrolyte 84. The porous body 86 (which is connected to the positive terminal 92 of the power supply 96) is anodized while the silver sheet 90 is cathodized with hydrogen gas being released therefrom, such as by equation (1), above. As a result, silver in the filled porous body 86 is oxidized to a divalent state to form AgO, such as by equations (2) and (3), above. Subsequent to working and drying, these silver oxide electrodes can be fabricated into electrochemical cells.

The above-described process avoids misshaping or buckling of the electrodes while optimizing the pore and active material contents in the electrodes so as to achieve high states of charge in geometrically stable electrode structures, regardless of the oxidation level of the active material thereof.

EXAMPLE

The following specific example is provided to clearly illustrate one embodiment of the invention, but should not be construed to limit the scope of the invention.

A substrate of Metrex brand reticulated silver from Eltech/Electromedia was impregnated with matter $AgNO_3$ by immersion therein at a temperature of 230° C. ($\pm 10°$ C). The substrate measured $2'' \times 2'' \times 1/16''$ and contained 60 pores per inch.

The substrate was removed from the molten $AgNO_3$ after immersion and then placed in a 10 wt % aqueous NaOH electrolyte at 25° C. A counter electrode was introduced to the NaOH solution, current was applied and reduction was carried out for 1 hour at a current of 3.5 A. The electrolyte was then changed to decrease the $NO_3^-$ content and the reduction continued overnight at a current of 0.5 A.

After removal of ash and drying, the weight gain achieved by the substrate was 7.9 g. The entire impregnating and reduction procedure as described above was repeated, and an additional weight gain of 6.7 g was achieved. A third impregnation and reduction cycle resulted in an additional weight gain of 6.7 g.

The foregoing detailed description is given for clearness of understanding only, and no unnecessary limitations should be understood therefrom, as modifications within the scope of the invention will be obvious to those skilled in the art.

I claim:

1. A method of forming an article comprising microporous elemental silver, said method comprising the steps of:
   (a) impregnating a porous conductive substrate with a liquid comprising molten silver nitrate;
   (b) crystallizing said silver nitrate in pores of said substrate;
   (c) converting said crystallized silver nitrate in an alkaline medium to form $Ag_2O$; and
   (d) electrochemically reducing said $Ag_2O$ to yield microporous elemental silver.

2. The method of claim 1 wherein said substrate comprises a material selected from the group consisting of foamed silver, foamed lead, foamed tin, and reticulated vitreous carbon.

3. The method of claim 2 wherein said substrate comprises reticulated vitreous carbon which is silver plated.

4. The method of claim 1 wherein said porous conductive substrate is formed by a method comprising: heating a precursor body formed of a mixture of silver oxalate and elemental silver in a reducing atmosphere to reduce at least a portion of said silver oxalate to microporous elemental silver to form said substrate, the proportion of said silver oxalate and the degree of said reduction being selected to result in a predetermined porosity.

5. The method of claim 4 wherein said substrate has a porosity of at least about 90%.

6. The method of claim 1 wherein said alkaline medium comprises an aqueous solution of an alkali metal hydroxide.

7. The method of claim 1 wherein at least about 60% of the pores of said substrate are filled with said silver nitrate prior to said conversion step.

8. The method of claim 1 wherein for said impregnation step said liquid consists essentially of molten silver nitrate.

9. The method of claim 1 wherein prior to said impregnation step, said molten silver nitrate is diluted through the presence of water.

10. The method of claim 1 wherein said impregnation, crystallization, conversion and reduction steps are sequentially carried out at least twice.

11. The method of claim 10 whereby said article attains a density of at least about 6.6 $g/cm^3$.

12. An article comprising microporous elemental silver prepared by a process comprising the steps of:
   impregnating a porous conductive substrate with a liquid comprising molten silver nitrate;
   crystallizing said silver nitrate in pores of said substrate;
   converting said crystallized silver nitrate in an alkaline medium to form $Ag_2O$; and
   electrochemically reducing said $Ag_2O$ to yield microporous elemental silver in said filled pores of said substrate.

13. The article of claim 12 wherein said substrate comprises a material selected from the group consisting of foamed silver, foamed lead, foamed tin and reticulated vitreous carbon.

14. The article of claim 13 wherein said substrate comprises reticulated vitreous carbon which is silver plated.

15. The article of claim 12 wherein said porous conductive substrate is formed by a method comprising:
   heating a mixture of silver oxalate and elemental silver in a reducing atmosphere to reduce a portion of said oxalate to elemental silver to form said substrate, the proportion of said oxalate and the degree of said reduction being selected to result in a predetermined porosity.

16. The article of claim 15 wherein said substrate has a porosity in the range of at least about 90%.

17. The article of claim 12 wherein said alkaline medium comprises an aqueous solution of an alkali metal hydroxide.

18. The article of claim 12 wherein said impregnating and crystallizing steps result in filling about 60% of the pores of said substrate with said silver nitrate prior to said conversion step.

19. The article of claim 12 wherein said liquid consists essentially of molten silver nitrate.

20. The article of claim 19 wherein said molten silver nitrate is diluted through the presence of water.

21. The article prepared by at least two sequential repetitions of the process of claim 12.

22. The article of claim 21 wherein said silver oxide attains a density of at least about 6.6 $g/cm^3$.

23. A method of preparing an electrode comprising AgO, said method comprising the steps of:
   (a) forming an article comprising microporous elemental silver by impregnating a porous conductive substrate with a liquid comprising molten silver nitrate, crystallizing said silver nitrate in pores of said substrate, converting said crystallized silver nitrate in an alkaline medium to form $Ag_2O$, and electrochemically reducing said $Ag_2O$ to yield microporous elemental silver;
   (b) forming an integral body from said article comprising microporous elemental silver; and
   (c) oxidizing said microporous elemental silver of said integral body to form AgO.

24. The method of claim 23 wherein said substrate comprises a material selected from the group consisting of foamed silver, foamed lead, foamed tin, and reticulated vitreous carbon.

25. The method of claim 24 wherein said substrate comprises reticulated vitreous carbon which is silver plated.

26. The method of claim 23 wherein said porous conductive substrate is formed by a method comprising:
heating a precursor body formed of a mixture of silver oxalate and elemental silver in a reducing atmosphere to reduce at least a portion of said silver oxalate to microporous elemental silver to form said substrate, the proportion of said silver oxalate and the degree of said reduction being selected to result in a predetermined porosity.

27. The method of claim 26 wherein said substrate has a porosity of at least about 90%.

28. The method of claim 23 wherein said alkaline medium comprises an aqueous solution of an alkali metal hydroxide.

29. The method of claim 23 wherein at least about 60% of the pores of said substrate are filled with said silver nitrate prior to said conversion step.

30. The method of claim 23 wherein for said impregnation step said liquid consists essentially of molten silver nitrate.

31. The method of claim 23 wherein prior to said impregnation step, said molten silver nitrate is diluted through the presence of water.

32. The method of claim 23 wherein said impregnation, crystallization, conversion and reduction steps are sequentially carried out at least twice.

33. The method of claim 32 whereby said silver oxide attains a density of at least about 6.6 g/cm$^3$.

* * * * *